Figure 1:
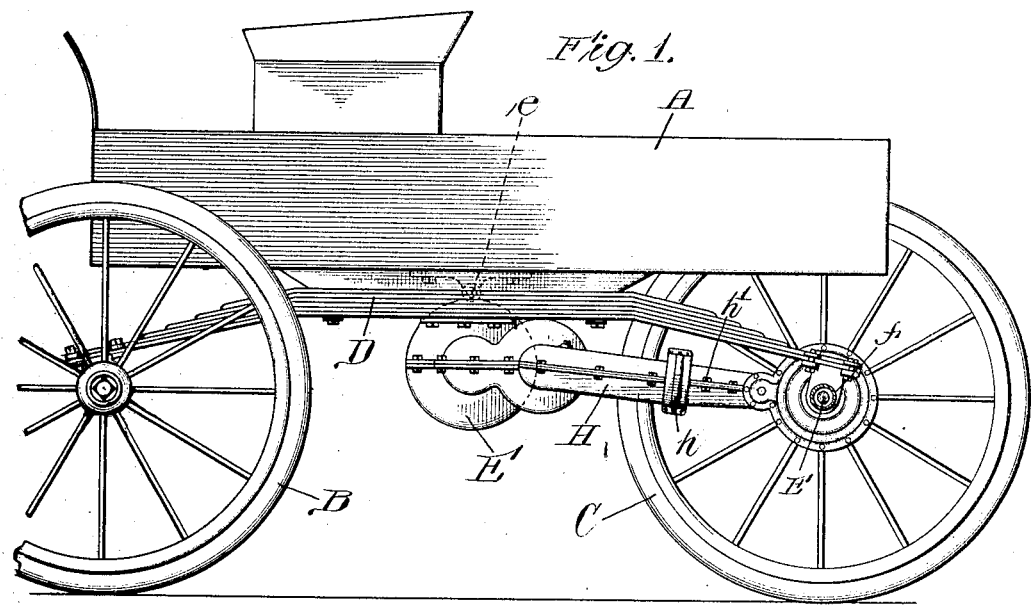

No. 895,661. PATENTED AUG. 11, 1908.
W. MORRISON.
AUTOMOBILE CONSTRUCTION.
APPLICATION FILED OCT. 31, 1904.

4 SHEETS—SHEET 1.

Witnesses:
Robert K. Weir
J. B. Weir

Inventor:
William Morrison
By Buckley & Durand
Attys.

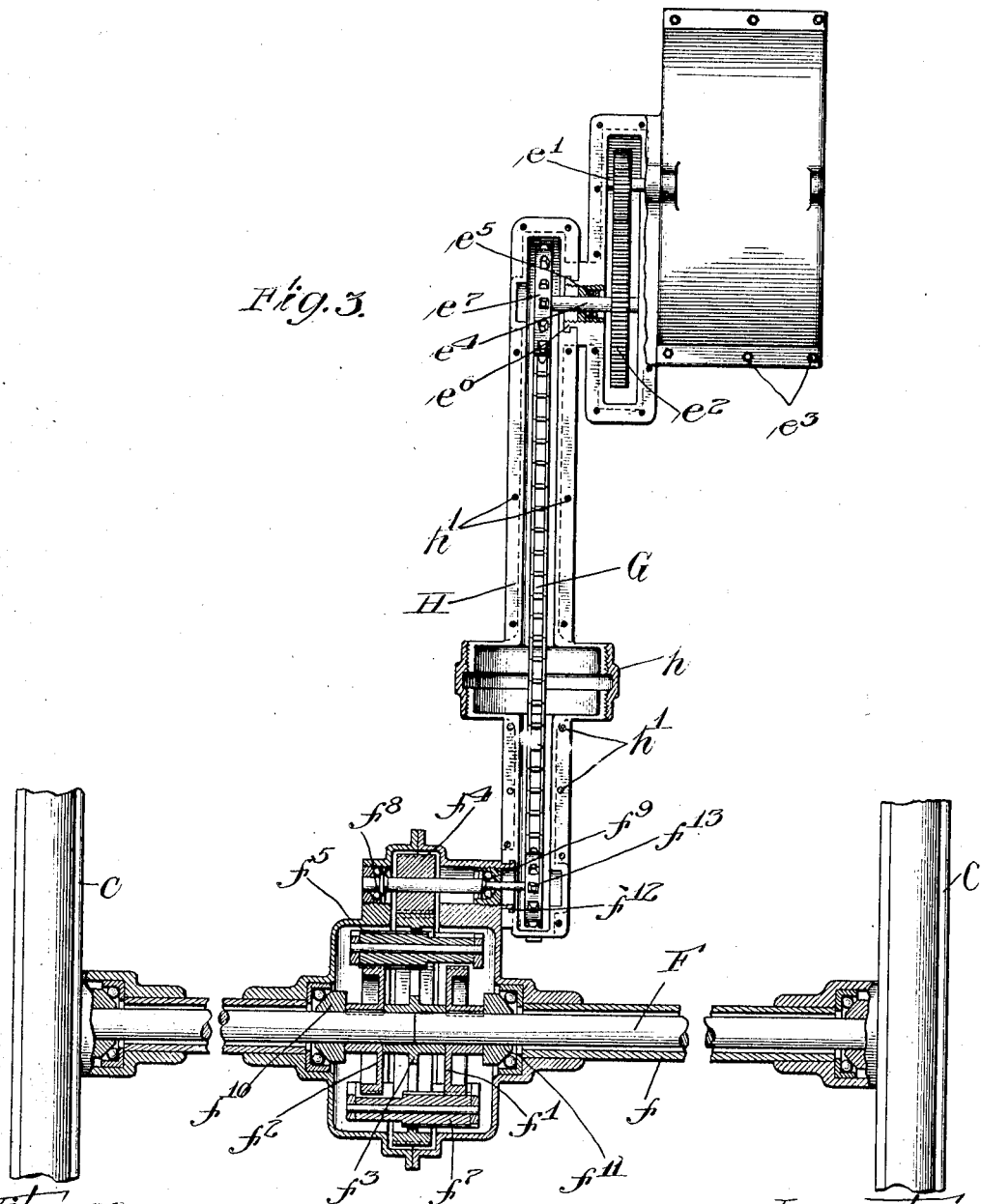

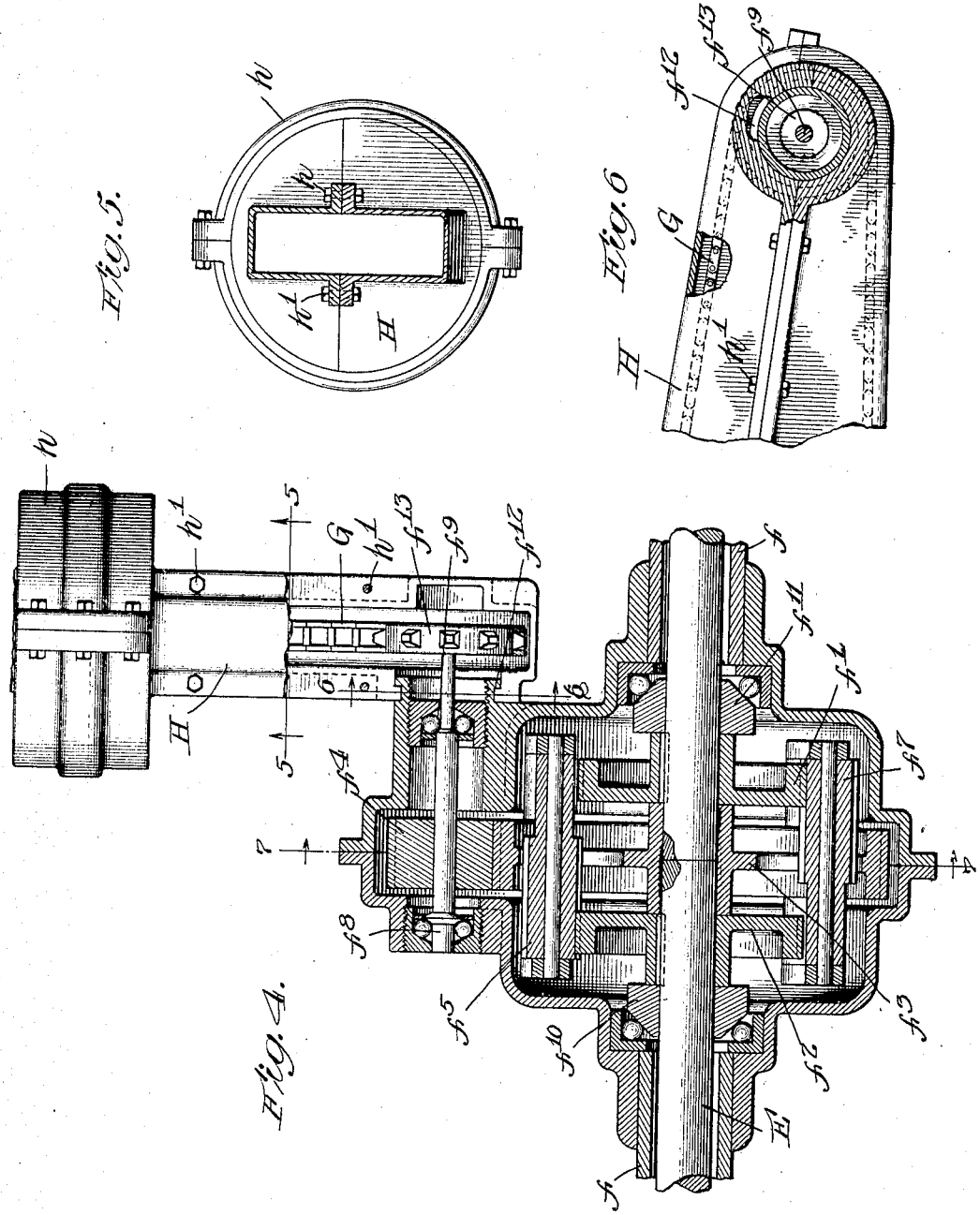

No. 895,661. PATENTED AUG. 11, 1908.
W. MORRISON.
AUTOMOBILE CONSTRUCTION.
APPLICATION FILED OCT. 31, 1904.
4 SHEETS—SHEET 4.
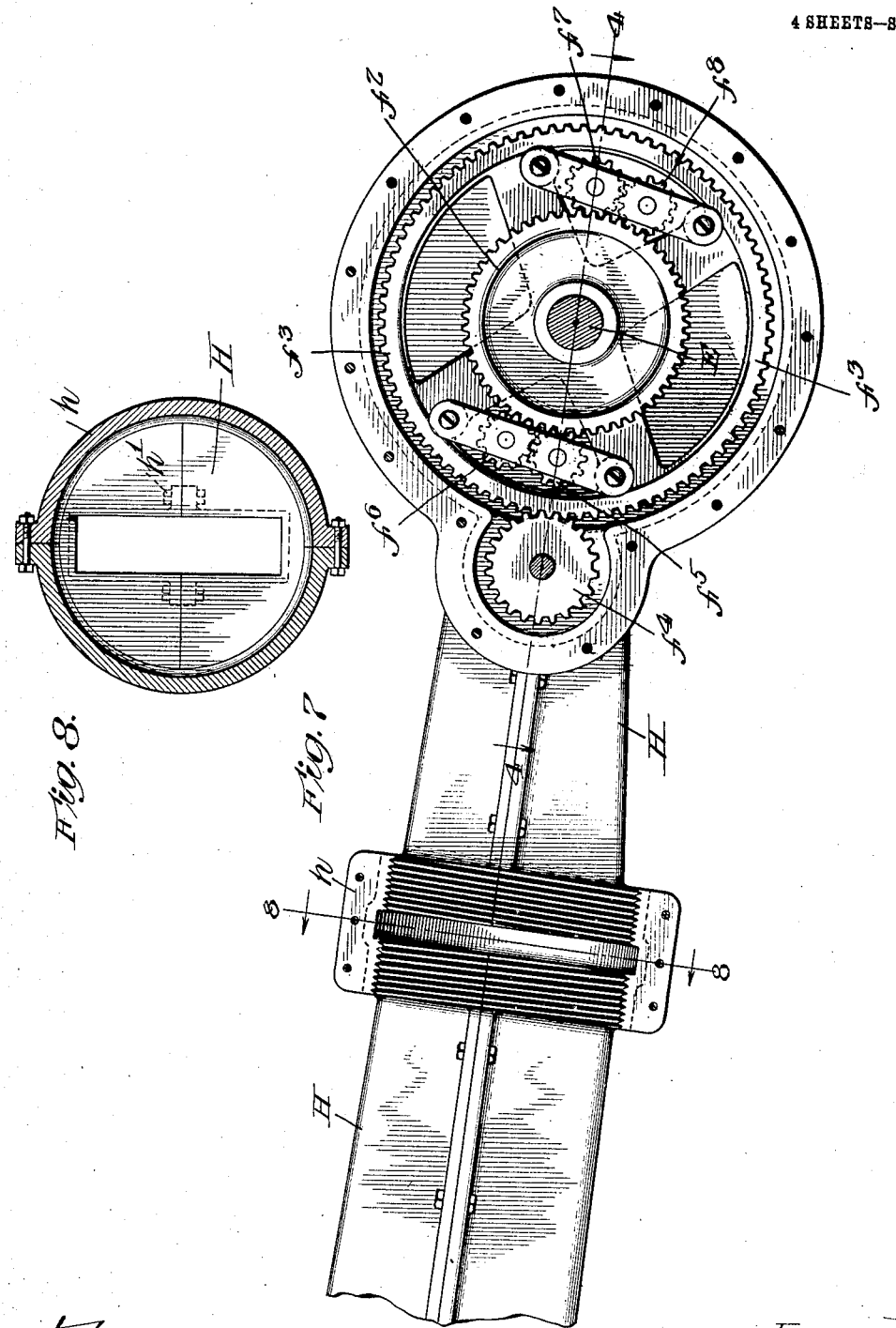

UNITED STATES PATENT OFFICE.

WILLIAM MORRISON, OF CHICAGO, ILLINOIS, ASSIGNOR OF ONE-THIRD TO M. A. LUMBARD, OF DES MOINES, IOWA.

AUTOMOBILE CONSTRUCTION.

No. 895,661.      Specification of Letters Patent.      Patented Aug. 11, 1908.

Application filed October 31, 1904. Serial No. 230,877.

*To all whom it may concern:*

Be it known that I, WILLIAM MORRISON, a citizen of the United States of America, and resident of Chicago, Cook county, Illinois, have invented a certain new and useful Improvement in Automobile Construction, of which the following is a specification.

If the motor or engine of an automobile is rigidly supported upon the body, and the said body connected with the axles by means of vehicle springs, it is evident that the sprocket chain, or other power-transmitting connection, employed for connecting said motor or engine with the rear axle or wheels, will be subject to more or less strain and disarrangement, while the vehicle is traveling along, owing to the fact that the body is free to rise and fall on the said springs, and to the further fact that this rise and fall of the body constantly subjects said chain or other connection to a shortening and lengthening effect, so to speak, due to the constant change in relation between the motor or engine and the rear axle, occasioned by the rise and fall of the motor or engine relatively to the said axle.

Generally speaking, the object of my invention is the provision of an improved construction and arrangement whereby the motor or engine may rise and fall freely, when the springs upon which the body of the automobile is mounted yield or bend, without causing any straining or disarrangement of the connections between the motor or engine and the rear axle.

A special object is to provide an improved construction and arrangement whereby the motor or engine may be swingingly supported from the body of the automobile, so as to prevent the rise and fall of the motor or engine from varying the distance between the two sprocket wheels of the driving chain, and at the same time practically improve the efficiency and certainty of the power-transmitting connections between the motive power and the rear vehicle wheels.

A further and important object of the invention is to provide an adjustable member adapted to serve as the means for both inclosing and tightening or adjusting the sprocket chain.

An additional feature consists of an improved rear axle construction involving a novel and highly efficient arrangement of a differential gearing with relation to a divided axle inclosed within a non-rotary casing.

It is also an object, of course, to provide certain details and features of improvement tending to increase the general efficiency and serviceability of the motive power and the power-transmitting arrangement between the same and the rear vehicle wheels.

To the foregoing and other useful ends, my invention consists in matters hereinafter set forth and claimed.

Figure 2:
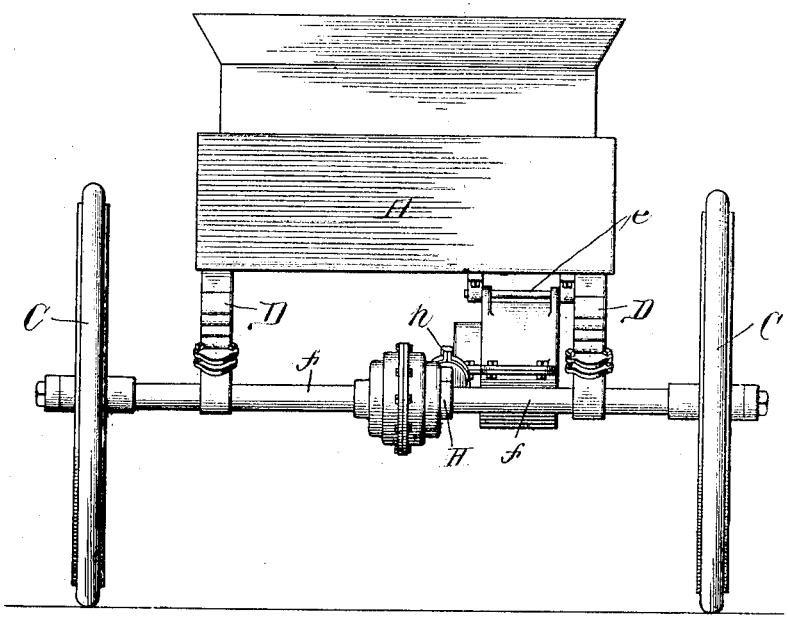

In the accompanying drawings—Figure 1 is a side elevation of an automobile embodying the principles of my invention; Fig. 2 is a rear elevation of the same; Fig. 3 is an enlarged plan of the motor, rear axle and power-transmitting connections; the casing, axle, differential gearing and the casing which incloses the sprocket chain being shown in horizontal section; Fig. 4 is an enlarged horizontal section of the differential gearing and the casing inclosing the same, showing a portion of the sprocket chain casing or cover in plan; Fig. 5 is a section on the line 5—5 in Fig. 4; Fig. 6 is a section on line 6—6 in Fig. 4; Fig. 7 is a section on line 7—7 of Fig. 4, the gearing being shown in side elevation; and Fig. 8 is a cross-section on line 8—8 of Fig. 7.

As thus illustrated, my improved automobile comprises a box or body A, of any suitable design or construction, and front and rear vehicle wheels B and C. It will be observed that the said wheels are connected with the said box or body through the medium of vehicle springs D. These springs, it will be understood, take up the vibration incident to the passage of the vehicle over a rough road, and permit the box or body to rise and fall relatively to the axles.

The motor E can be of any suitable form or construction, but is preferably suspended from the box or body by a pivotal connection $e$. This, it will be seen, permits the motor, which in this case is an electric motor, to swing relatively to the said box or body. As shown, the rear vehicle wheels C are secured to the two sections of a split or divided axle F, the same being inclosed by a tubular casing $f$. The rear ends of the springs D can be secured to the said tubular casing in any desired or suitable manner. The gear wheel $f^1$ is secured to one section of the said axle, while a similar gear wheel $f^2$ is secured to the other section. A similar larger wheel $f^3$ is loosely mounted upon the abutting end portions of the two sections of the axle, and is adapted to engage the pinion $f^4$. This pinion $f^4$ is, it will be seen, mounted in suitable bearings formed in the enlargement of the casing $f$, which incloses the axle and the differential gearing. A pair of pinions, suitably mounted in bearings, carried by the gear $f^3$, are arranged at each side of the wheels $f^1$ and $f^2$. For example, the pinion $f^5$ engages the gear wheel $f^2$, while its mate $f^6$ engages the gear wheel $f^1$, and the two pinions meshing or engaging with each other. In a similar manner the pinion $f^7$ engages the gear wheel $f^1$, while its mate $f^8$ engages the gear wheel $f^2$, and the two pinions engaging each other. As these pinions $f^5$, $f^6$, $f^7$ and $f^8$ are all carried or mounted in bearings on the gear wheel $f^3$, it is evident that the rotation of the gear wheel $f^3$ will cause the two sections of the axle to rotate in unison. At the same time, and owing to the differential or compensating character of the gearing thus provided, one section of the axle may easily run ahead of or lag behind the other section. This, as will be readily understood, is with respect to the desirability of providing an arrangement whereby an automobile may readily turn around or may turn corners in such manner that the rear driving wheel on the outside of the turn may run faster than the other.

It will be seen that the pinions $e^1$ of the gear wheel $e^2$ are preferably and desirably inclosed by the casing of the motor, said casing being preferably composed of two halves or sections joined to each other along a horizontally and centrally located line. As illustrated, the said two halves or sections of the motor casing are secured together by means of bolts $e^3$, and the shaft $e^4$ of the gear wheel $e^2$ passes through a gland or ball bearing $e^5$. It will also be observed that the shaft of the pinion $f^4$ extends through and works in glands or ball bearing devices $f^8$ and $f^9$. In addition, the two sections of the axle are preferably supported in ball bearings $f^{10}$ and $f^{11}$, the same being arranged at opposite sides of the gear wheels secured to the end portions of said axle sections. Preferably, the casing which incloses the differential gearing is made in two sections, the same being provided with flanges secured together by bolts or other fastening means. Also, as illustrated, the said casing inclosing the differential gearing is provided with a flanged boss $f^{12}$ surrounding the shaft on which the pinion $f^4$ is mounted. In a somewhat similar manner, the motor casing, when its two halves or sections are secured together, is provided with a flanged boss $e^6$ surrounding the shaft $e^4$.

A sprocket wheel $e^7$ is secured at the end of the shaft $e^4$, while a similar sprocket $f^{13}$ is secured to the end of the shaft upon which the pinion $f^4$ is mounted. A sprocket chain G is employed as a medium of power-transmitting connection between said sprocket wheels. The casing H, which incloses the said sprocket chain and sprocket wheels, is preferably divided, both longitudinally and transversely, into sections adapted to be fitted together. For example, the said sprocket chain casing or inclosure can be divided at a point between its ends, and the abutting end portions of the sections coupled together by a ring $h$ having right and left threads adapted to engage the threads on the outer cylindric surfaces of the enlarged end portions of the two casing sections. These two sections of the casing, arranged end to end in this manner, are divided longitudinally and secured together, at each side, along longitudinal lines, by bolts or other fastening devices $h^1$. It will be observed that the said bolts $h^1$ are inserted through flanges extending along the sides of the casing, thus affording what may be called a flanged union. This split or divided character of the sprocket chain casing is, it will be seen, desirable, inasmuch as it is more easily and conveniently fitted upon the flanged bosses $e^6$ and $f^{12}$. The ring $h$ may also be composed of two arc-shaped sections secured together by screws or bolts. When the parts are thus assembled, the bosses $e^6$ and $f^{12}$ are adapted to turn or oscillate relatively to the bearings in which they are inclosed, it being understood that the connections between the vehicle springs and the tubular casing $f$ are of such character as to hold the latter rigidly and against turning. With this arrangement, it is obvious that the motor may rise and fall with the box or body, and that at such time it will swing about its pivotal connection $e$ with the bottom of said box or body. This, of course, is due to the fact that the distance between the axle and the pivotal point $e$ increases as the box or body moves downward, and, vice versa, decreases when the box or body moves upward. Ordinarily, and without the flexible connections which are employed between the power and the axle, such a variation in distance between the motor and the rear axle would cause the chain to be first tight and then loose, and would produce other undesirable or injurious effects upon the connections between the motor and the rear or driving wheels. With my improved arrangement, however, it is obvious that the motor is so mechanically connected with the driving wheels that the power is efficiently transmitted, while at the same time the motor may swing relatively to the box or body for the purpose of maintaining the desired condition of the power transmitting connections. In other words, the arrangement is such that, notwithstanding the fact that the two sprocket wheels have their shafts mounted in a member which is rigid from end to end, so as to render the distance between the two sprocket wheels invariable, the arrangement is nevertheless of such character that the motor may rise and fall with the box or body, without producing any disarrangement or undesirable effects upon the driving connections.

Obviously, the ring $h$ can, with the arrangement shown, be employed for adjusting the two sprocket wheels relatively to each other, so as to tighten or loosen the sprocket-chain. Furthermore, the sprocket-chain casing is, although thus adjustable or endwise extensible, of a strong and rigid character, and is preferably capable of containing oil in sufficient quantity to insure efficient lubrication of the chain and bearings.

It is evident that the hollow member H is a combined sprocket-chain cover and adjuster—that is to say, it serves as the means for both inclosing and tightening or otherwise adjusting the chain.

What I claim as my invention is:

1. An automobile comprising vehicle wheels, a suitable body, a motor swingingly mounted on said body, springs interposed between said body and wheels, said motor having a casing composed of segment-shaped sections, said sections being adapted to provide a hollow flanged boss, a sprocket-wheel having its shaft extended through said boss and connected with the motor shaft, a rear axle construction having a casing provided with a hollow flanged boss, another sprocket-wheel provided with a shaft extending through said last mentioned hollow boss and suitably connected with the rear axle of the vehicle, a sprocket-chain connecting said sprocket-wheels, and a casing inclosing the chain and sprocket-wheels, the said casing thus inclosing the sprocket-chain and the sprocket-wheels being divided both longitudinally and transversely into sections which are rotatably mounted upon said hollow flanged bosses, and a threaded coupling adjustably connecting the ends of said sections, whereby the proper distance is maintained between said sprocket-wheels.

2. An automobile comprising power transmitting connections including sprocket wheels connected by a sprocket chain, one of said sprocket wheels being mounted for bodily swinging movement relatively to the portion of the automobile by which it is carried, and a connection for both inclosing said sprocket chain and maintaining the proper distance between said sprocket wheels, together with an endwise extensible member having its opposite ends pivotally supported at points coincident with the axes of said sprocket wheels, substantially as described.

Signed by me at Chicago, Cook county, Illinois this 24th day of September 1904.

WILLIAM MORRISON.

Witnesses:
CLARENCE M. THORNE,
JENNIE NORBY.